United States Patent
Maerz et al.

[11] Patent Number: 5,818,991
[45] Date of Patent: Oct. 6, 1998

[54] OPTICAL COUPLING ARRANGEMENT COMPOSED OF A PAIR OF STRIP-TYPE OPTICAL WAVEGUIDE END SEGMENTS

[75] Inventors: Reinhard Maerz; Gerhard Heise, both of Munich, Germany

[73] Assignee: Siemens Aktiengesellschaft, Munich, Germany

[21] Appl. No.: 786,896

[22] Filed: Jan. 23, 1997

[30] Foreign Application Priority Data

Jan. 25, 1996 [DE] Germany ............... 196 02 678.4

[51] Int. Cl.[6] .................................................. G02B 6/26
[52] U.S. Cl. ......................... 385/50; 385/46; 385/147; 385/43
[58] Field of Search .......................... 385/50, 41, 42, 385/43, 45, 46, 48, 14, 147

[56] References Cited

U.S. PATENT DOCUMENTS

| 5,030,321 | 7/1991 | Coutandin et al. | 350/96.21 |
| 5,208,884 | 5/1993 | Groh et al. | 385/46 |
| 5,212,758 | 5/1993 | Adar et al. | 385/129 |
| 5,412,744 | 5/1995 | Dragone | 385/45 |
| 5,586,209 | 12/1996 | Matsuura et al. | 385/45 |

FOREIGN PATENT DOCUMENTS

| 0 651 267 | 5/1995 | European Pat. Off. |
| WO 89/06813 | 7/1989 | WIPO |

OTHER PUBLICATIONS

Kim et al "Compact, broadband, polarisation–insensitive 3dB optical power splitter on InP", *Electronics Letters*, vol. 30, No. 12, Jun. 9, 1994, pp. 953–954.

Zirngibl et al, "Efficient 1×16 Optical Power Splitter Based on InP", *Electronics Letters*, vol. 28, No. 13, Jun. 18, 1992, pp. 1212–1213.

Hatami–Hanza et al, "A New Low–Loss Wide–Angle Y–Branch Configuration for Optical Dielectric Slab Waveguides", *IEEE Photonics Technology Letters*, vol. 6, No. 4, Apr. 1994, pp. 528–530.

*Primary Examiner*—John Ngo
*Attorney, Agent, or Firm*—Hill & Simpson

[57] ABSTRACT

An optical coupling arrangement consist of a pair of strip-type optical waveguide end segments extending alongside one another and having ends arranged at a small distance from each other so that crosstalk can occur. In order to suppress the crosstalk at a point spaced from the ends of each of the end segments, the segments are arranged so that the distance from one another increases from the distance at the end as the distance from the end along said segments increases.

10 Claims, 3 Drawing Sheets

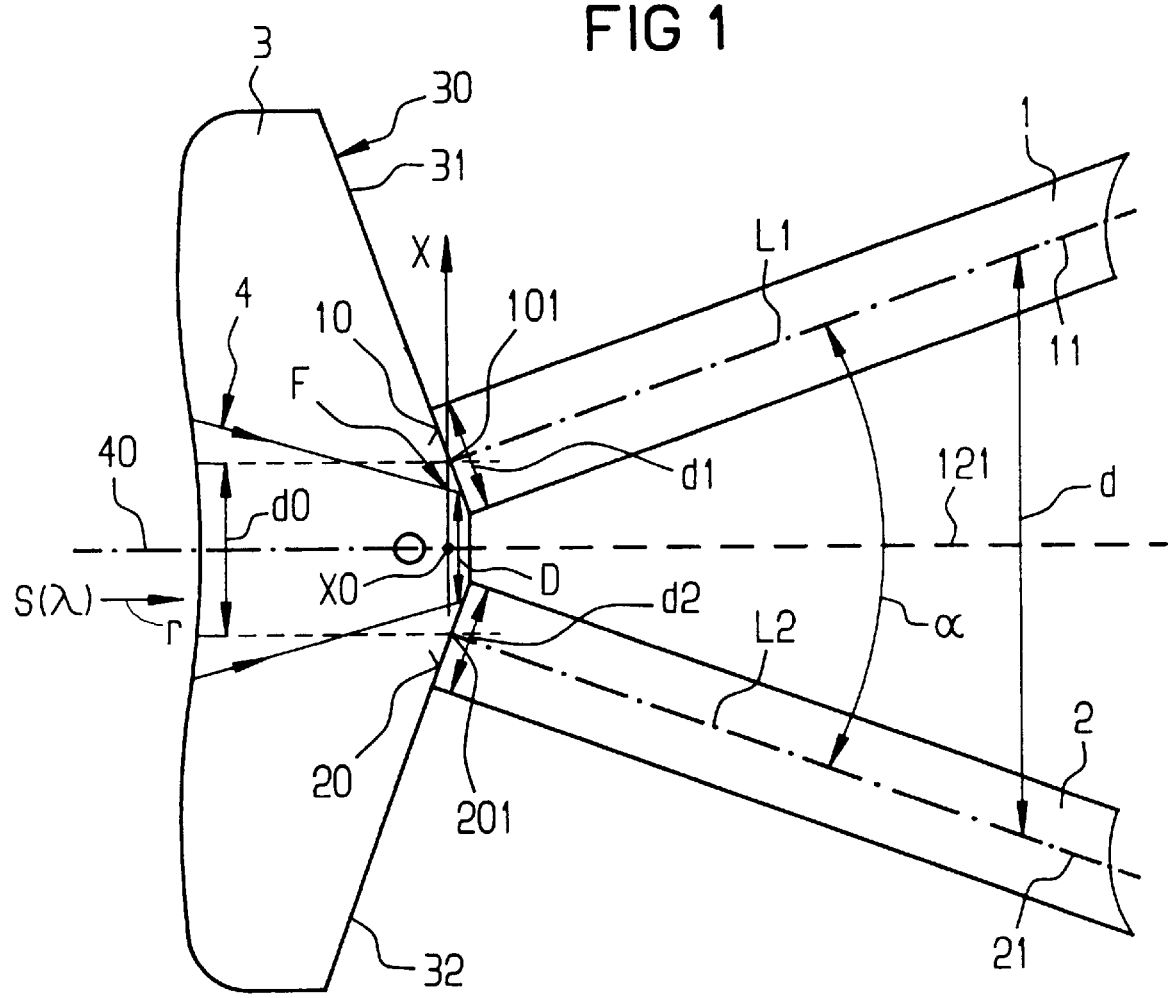

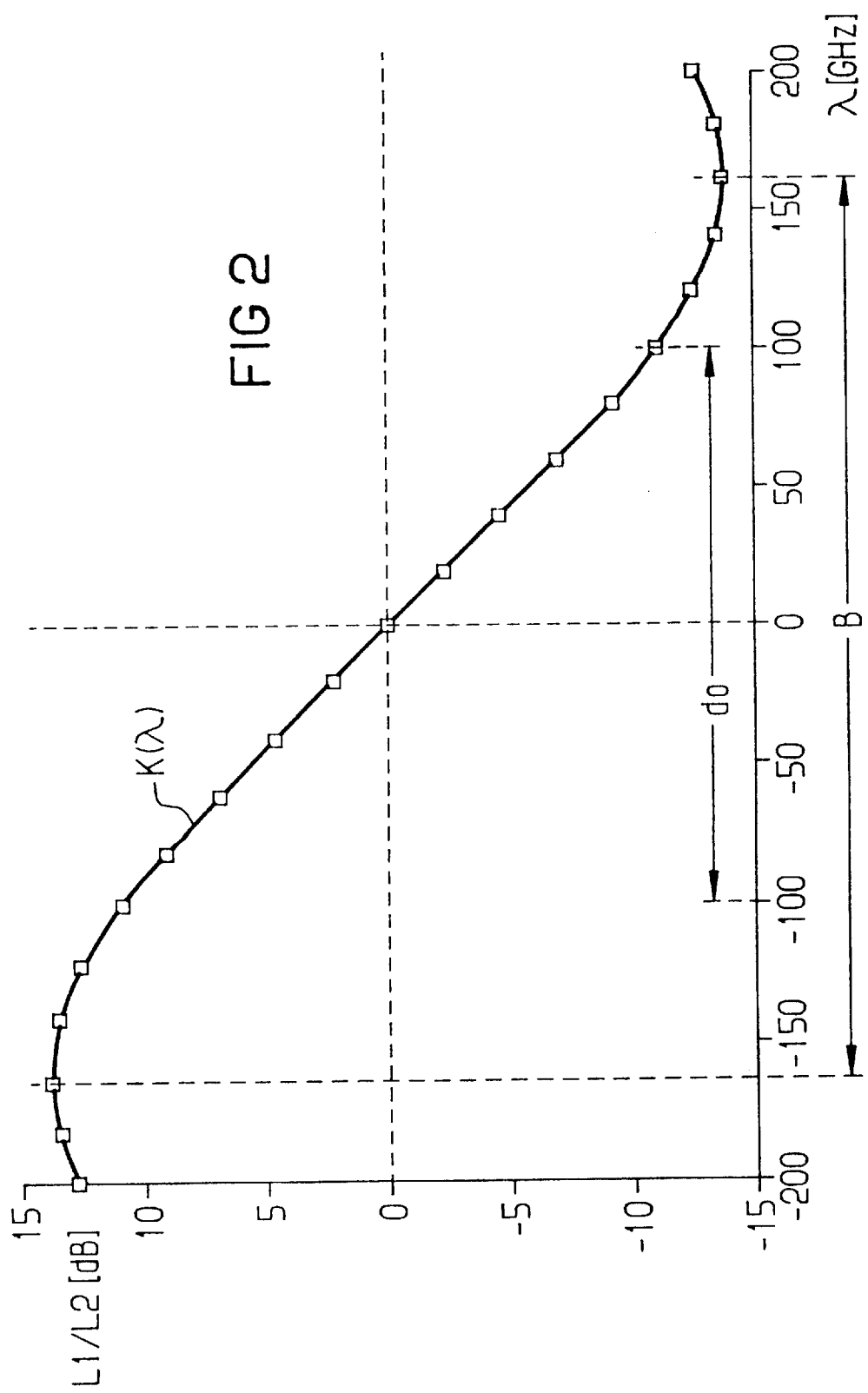

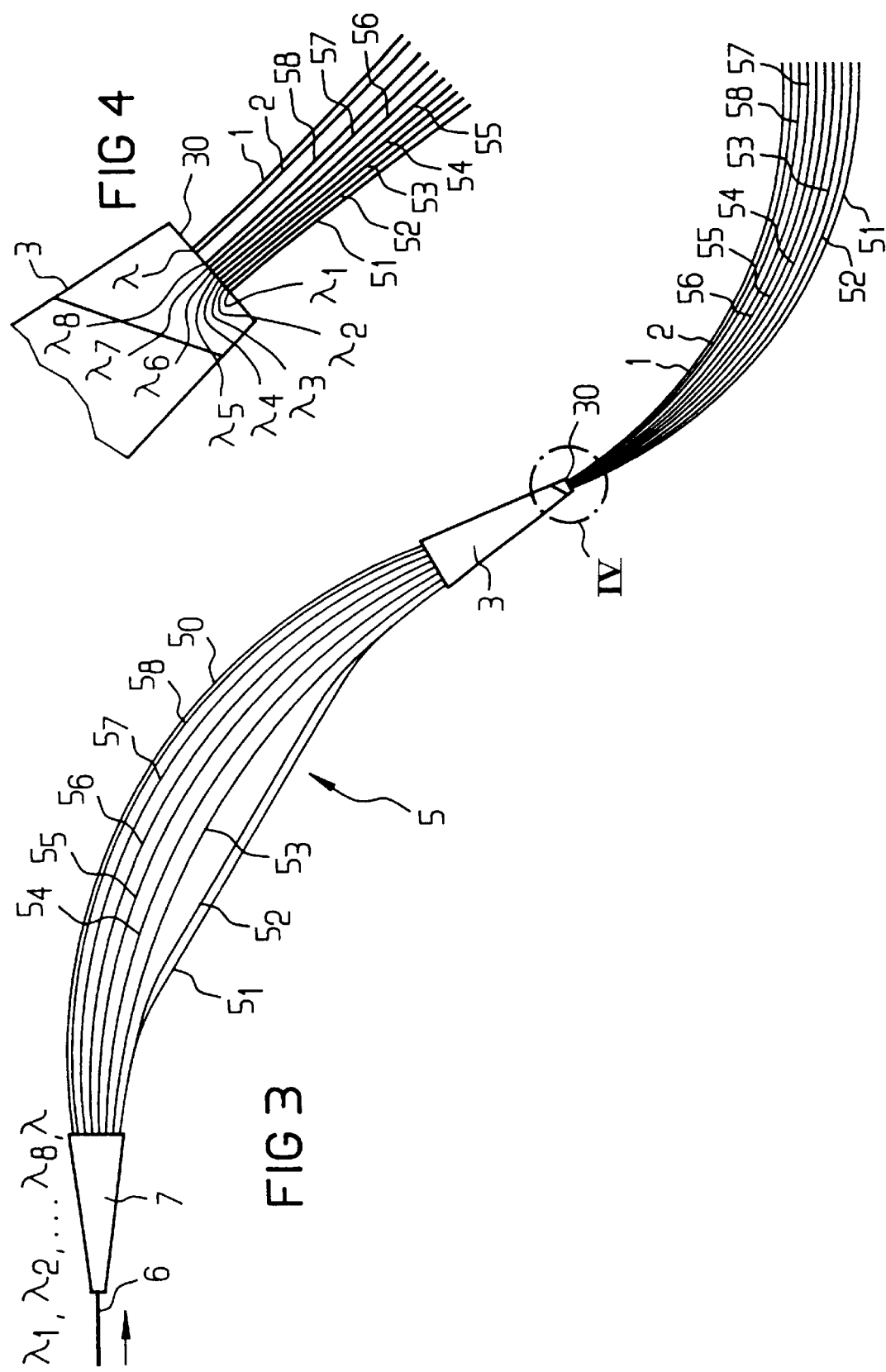

OPTICAL COUPLING ARRANGEMENT COMPOSED OF A PAIR OF STRIP-TYPE OPTICAL WAVEGUIDE END SEGMENTS

BACKGROUND OF THE INVENTION

The present invention is directed to an optical coupling arrangement having at least a pair of strip-type optical waveguide end segments that extend alongside one another with the ends being arranged alongside of one another for coupling optical radiation into the waveguide end segments wherein the ends are arranged at most at a small distance from one another so that crosstalk occurs in the optical waveguide segments that run next to one another.

An example of this type of coupling arrangement is an optical directional coupler which has the waveguide end segments positioned at a small enough distance from one another over the entire length of the coupling stretch beginning at the ends of the end segments so that crosstalk occurs along this coupling stretch. For example a coupling over will occur between the waveguide end segments of the optical radiation coupled in via the ends. In a directional coupler, a crosstalk of this type is necessary for operability.

SUMMARY OF THE INVENTION

The underlying object of the present invention is to provide a coupling arrangement of the type having the ends of the waveguides spaced at a small distance from one another to enable crosstalk between the waveguide end segments but however the crosstalk is suppressed along the waveguide end segments spaced from the end.

To accomplish this object, the present invention is directed to improvements in an optical coupling arrangement having at least one pair of strip-type optical waveguide end segments which run alongside one another with the ends arranged alongside one another for coupling optical radiation into the waveguide end segments with the ends being arranged at a small distance from one another so that crosstalk occurs in the optical waveguide end segments that run next to one another. The improvement comprises the waveguide end segments being arranged at a distance which increases from the small distance at the ends as the distance from the ends increases.

By means of the inventive arrangement, the crosstalk between the two output waveguides can be advantageously suppressed as far as possible.

For example, the waveguide end segments respectively comprise an optical longitudinal axis, which axes are arranged at the ends of the waveguide end segments at an oblique angle relative to one another. This angle is for example smaller than an aperture angle at the end of a waveguide end segment. The angle is preferably less than 2° and an angle of 1° already leads advantageously to an effective suppression of the crosstalk.

The ends of the waveguide end segments are preferably coupled to a frontal surface of a layer waveguide. This embodiment is usable not only with two waveguide end segments coupled to the frontal surface of the layer waveguide, but it can be used given the presence of more than two waveguide end segments at each pair of adjacent ends, in which the crosstalk occurs due to a small distance between the ends of this pair.

In a preferred embodiment of this arrangement, the frontal surface of the layer waveguide comprises at least two frontal surface segments that stand or extend at an oblique angle to one another, and the two waveguide end segments are coupled to the surface segments in such a way that the end of each waveguide end segment is coupled to a separate frontal surface segment. This waveguide end segment comprises a longitudinal axis that extends essentially perpendicular to this one surface segment, and the end of the other waveguide end segment is coupled to the other frontal surface segment and has a longitudinal axis that extends essentially perpendicular to this other segment.

An inventive arrangement can be advantageously realized in any material system in which optical waveguide structures can be manufactured.

Strip-type waveguide means a waveguide with a longitudinal axis in which the conducted radiation is essentially propagated only along this axis and not perpendicular to it. Examples of such waveguides are integrated waveguides such as rib waveguides, diffused-in or implanted waveguides, but also includes optical fibers, for example glass fibers.

In an advantageous embodiment of the inventive arrangement, the ends of the waveguide end segments are coupled to an individual wavelength channel of an optical phased array, which channel is allocated to a determinate or established wavelength. Using this arrangement, for example the channel positions of the phased array can be stabilized, as specified in copending application U.S. Ser. No. 08/788189 which claims priority from the German patent application 196 02 677.6, filed Jan. 25, 1996.

An advantageous method for the operation of the inventive arrangement consists in that the radiation to be coupled in is supplied to the ends of the waveguide end segments in the form of a beam comprising a determinate or established diameter, which is adjusted to a fixed or established spatial position in relation to the ends of the waveguide. It is thereby advantageous if the beam is set to the established position by means of displacement in the direction of the small distance.

The determinate or fixed diameter can be larger or smaller than a diameter of the end of a waveguide end segment. Preferably, the fixed diameter of the beam is essentially equal to the diameter of the fundamental mode conducted in a waveguide end segment.

For example, the radiation to be coupled into the ends of the unexpected end segments is focused with one focal point of the established diameter on the ends of the waveguide end segments, which is adjusted to the established position in relation to the ends of the waveguide end segments.

There are cases in which the spatial position of the beam or focus relative to the ends of the waveguide end segments depends on a wavelength of the radiation to be coupled in. An example of a case of this sort is an optical spectrometer or an optical phased array. In such a case, the beam or focus can be adjusted to the extended position in relation to the ends by adjusting the wavelengths of the radiation to a value corresponding to the established position.

A particular advantage of this inventive method lies in the application or use of the invention for the setting of a definite power ratio of the radiation focused on the ends of the two waveguide segments between a portion coupled into one waveguide end segment, and a portion, coupled into the other waveguide segment. This application is enabled by means of a favorable characteristic of the inventive arrangement which characteristic is based on the suppression of the crosstalk.

Other advantages and features of the invention will be readily apparent from the following description of the preferred embodiments, the drawings and claims.

BRIEF DESCRIPTION OF THE DRAWINGS

FIG. 1 is a schematic representation of a top view of an exemplary embodiment of the inventive arrangements;

FIG. 2 is a graph of the ratio of the power coupled into two waveguides in relationship to the wavelength for the embodiment of FIG. 1;

FIG. 3 is a schematic representation of an example of an optical phase array to which the inventive arrangement can be coupled; and FIG. 4 is an enlarged representation enclosed in the broken line circle IV of FIG. 3.

DESCRIPTION OF THE PREFERRED EMBODIMENT

The principles of the present invention are particularly useful when incorporating an optical coupling arrangement consisting of a pair of strip-type optical waveguide end segments 1 and 2 that extend alongside one another as illustrated in FIG. 1. As illustrated, the end segment 1 has end 10 and the end segment 2 has an end 20 which are arranged adjacent each other for the coupling of an optical radiation S which is supplied from a common direction indicated by the arrow r into the waveguide segments 1 and 2.

The ends 10 and 20 have centers 101 and 201 respectively and are arranged at a measured distance d0 from one another which is distance between the center 101 from the center 201. This distance d0 is dimensioned small enough that crosstalk will occur in the optical waveguide end segments 1 and 2 running alongside one another with this small distance d0. In the example according to FIG. 1, the small distance d0 is chosen so that there is a gap between the ends 10 and 20. However, it could also be arranged so that the ends 10 and 20 touch one another without a gap.

According to the invention, the waveguide segments 1 and 2 are arranged at a distance d from one another, which increases from the small distance d0 as the distance from ends 10 and 20 increases. At the assumed direction r of the radiation S which is be coupled into the waveguides, this means for example that the distance d will increase as the distance from the ends 10 and 20 increases in the direction r.

The waveguide end segments 1 and 2 each have an optical longitudinal axis 11 and 21 respectively. The axes 11 and 21 are arranged obliquely to one another in an angle α, which opens out in the assumed direction r from the ends 10 and 20 of the end segments 1 and 2.

The exemplary embodiment according to FIG. 1 is constructed so that the angle α comprises a bisecting line 121 oriented in the direction r, and the increasing distance d is the distance, which is measured perpendicular to the bisecting line 121, between the two longitudinal axes 11 and 12 of the waveguide end segments 1 and 2. Moreover, the embodiment is constructed so that the longitudinal axis 11 of the waveguide end segment 1 goes through the center 101 of the end 10 of this end segment 1, and the optical longitudinal axis 21 of the other waveguide end segment 2 goes through the center 201 of the end 20 of this other end segment 2.

The angle α is for example selected smaller than an aperture angle at the end 10 or, respectively, 20 of a waveguide end segment 1 and/or 2, and can be less than 2°. In a concrete realization of the exemplary embodiment, the angle α was about 1.6°.

The ends 10 and 20 of the waveguide end segment 1 and 2 are for example coupled to a frontal surface 30 of a layer waveguide 3. The radiation S to be coupled into the end segments is supplied, to the ends 10 and 20 from this layer waveguide 3.

The frontal surface 30 comprises for example two frontal surface segments or portions 31 and 32 extending obliquely at an angle α to one another. The two waveguide end segments 1 and 2 are coupled to the surface segments. For example, the end 10 of the waveguide segment 1 is coupled to the frontal surface segment 31, and the end 20 of the other waveguide end segment 2 is coupled to the other frontal surface segment 32. The converse of this could also hold.

Each waveguide end segment preferably comprises a longitudinal axis that essentially extends perpendicular to the frontal surface segment to which the end segment is coupled. In relation to the example in FIG. 1, this means that the waveguide end segment 1 coupled to the surface segment 31 has the longitudinal axis 11 extending essentially perpendicular to this surface segment 31, and the waveguide end segment 2 has the longitudinal axis 21 extending essentially perpendicular to the surface segment 32.

After the increasing distance d of the waveguide end segments 1 and 2 from one another reaches a sufficiently large value for a suppression of the crosstalk, the waveguide end segments 1 and 2 can make a transition into parallel strip-type waveguides (not shown), which have a distance from one another that is at least equal to this large value of the distance d. The transition can for example be produced by means of a curvature of the waveguide end segments 1 and 2. It is thereby useful, though not necessary, if the waveguide end segments 1 and 2 run at first in a straight line for a certain stretch starting from the ends 10 and 20 with the axes 11 and 21 extending in a straight line, and then the waveguide end segment make a transition if necessary to a path with a curved longitudinal axis 11 or, respectively, 21.

The exemplary embodiment can for example be operated in such a way that the radiation S to be coupled into the end segments is supplied to the ends 10 and 20 of the waveguide end segments 1 or, respectively, 2 in the form of a beam 4 having established or a determinate diameter D, which is set to a determinate or fixed position X0 in relation to the ends 10, 20. The position of the beam 4 is for example determined by the position of an axis 40 of this beam 4 in relation to the ends 10 and 20.

The beam 4 is preferably a collimated or focused beam. The radiation S to be coupled in is for example focused with one focus or focal path F at the ends 10 and 20 of the waveguide end segments 1 and 2, set to the determined position X0 in relation to the ends 10 and 20.

The beam 4 or, respectively, focus F is preferably set to have an axis passing through the determinate or fixed position X0 by displacement of the axis in the direction of the small distance d0, which in FIG. 1 is along the direction of the x axis. In FIG. 1, the determined or fixed position X0 is for example chosen so that it lies in the middle between the centers 101 and 201 of the ends 10 and 20. This middle position is the preferred one in many cases. The determined position X0 can however deviate from the middle position from case to case.

In FIG. 1, the beam 4 or, respectively, focus F is shown in such a way that the axis 40 of the beam 4, which is at the same time an axis of the focus F, is for example oriented as the angle bisector 121 in the assumed direction r.

It is to be noted that the inventive coupling arrangement is not limited to a determined direction r of the radiation S to be coupled in. For certain possible applications of the inventive coupling arrangement, e.g. spectrographs, a determinate direction r of the radiation S is however predetermined. This can consist for example in a target or main direction of propagation r of the radiation S, from which certain deviations are allowed. In such a case, the axis 40 can deviate from the direction r by a certain angle (not shown), e.g. an angle that lies within a predeterminable or predetermined region of allowability. A deviation from the direction r can depend on the spatial position of the beam 4 or, respectively, the focus F in relation to the ends 10 and 20, e.g. the position x of the beam axis 40 on the x axis.

In cases in which the position of the beam 4 or, respectively, focus F relative to the ends 10 and 20, e.g. the position x, depends on a wavelength $\lambda$ of the radiation S to be coupled in, e.g. $x=f(\lambda)$ holds, whereby f is a determinate or particular function, the beam 4 or, respectively, focus F can be set to the determined position X0 by setting the wavelength $\lambda$ of the radiation S to a value corresponding to the determined position X0.

Such relations are for example present in a spectrograph. The inventive coupling arrangement, and in particular the inventive method, can be used in spectrographs of this type, e.g. at the output side, for various purposes.

An inventive method can for example advantageously be used to set a defined power ratio between a power portion, which is coupled into a waveguide end segment, and a power portion, which is coupled into the other waveguide end segment, of the radiation S supplied to the ends 10 and 20 of the two waveguide end segments 1 and 2. For example, the power ratio L1/L2 or L2/L1 can be set between a power portion L1 coupled into the waveguide end segment 1 and a power portion L2 coupled into the other waveguide end segment 2.

This application is based on the advantageous characteristic of the inventive coupling arrangement, which characteristic is based on the suppression of the crosstalk, according to which characteristic the power ratio in the region of the small distance d0 between the ends 10 and 20 is an unambiguous monotonic function of the position x of the beam 4 or, respectively, focus F in relation to the ends 10 and 20. Thus there arises the particular advantage that the power ratio is a monotonic function of the position x of the beam 4 or, respectively, of the focus F, not only in the region of the small distance d0, but in a larger region containing this region. Due to this fact, the inventive arrangement is outstandingly suited for regulation purposes via the power ratio as target and actual quantity, whereby a large capture range is moreover provided.

In the case in which the position x in the region of the distance or in the larger region is an unambiguous monotonic function f of the determined wavelength $\lambda$ of the radiation S to be coupled in, which holds in many cases, the power ratio in this region is also an unambiguous monotonic function of this wavelength $\lambda$.

An example for a case of this sort is shown in FIG. 2, in which as an example the power ratio L1/L2 is plotted in dependence on the wavelength $\lambda$ of the radiation S.

In this example, the radiation S was focused on the ends 10 and 20 with a diameter D, which was essentially equal to the diameter of the fundamental mode respectively conducted into the waveguide end segments 1 and 2, which are for example dimensioned equally to one another. The diameter of the fundamental mode led into each waveguide end segment 1 and 2 is comparable with the diameter d1 or, respectively, d2 of this segment 1 or, respectively, 2.

The position x of the beam 4 or, respectively, of the focus F depends on the larger region on the wavelength $\lambda$, essentially in linear fashion.

The small distance d0 measured between the centers 101 and 201 of the ends 10 and 20 was e.g. 10 $\mu$m, and was selected larger than the sum of the diameters of the two conducted fundamental modes. The 10 $\mu$m corresponded to 200 GHz.

The zero point 0 of the x axis in FIG. 1 lay precisely in the middle between the two centers 101 and 201 of the ends 10 and 20. This zero point 0 corresponds to the zero point 0 of the $\lambda$ axis in FIG. 2. It can be seen clearly that the capture region B, i.e. the region in which the power ratio L1/L2 is a monotonic function $K(\lambda)$ of the wavelength $\lambda$, is somewhat larger than the region from −150 GHz to +150 GHz, which corresponds to a region of the position x from −7.5 $\mu$m to +7.5 $\mu$m.

A preferred application of the inventive arrangement, in which the ends 10 and 20 of the waveguide end segments 1 and 2 are coupled onto an individual wavelength channel of an optical phased array 5, which channel is allocated to a determined wavelength $\lambda$ is illustrated in FIGS. 3 and 4.

In the phased array 5, shown in its entirety in FIG. 3, a strip-type optical waveguide 6 is coupled onto an input-side optical layer waveguide 7 of the phased array 5, for the common supplying of several, for example eight, optical wavelengths $\lambda_1$ to $\lambda_8$, which wavelength differ from one another and the determined wavelengths $\lambda$ different from these wavelengths, to the phased array 5. The phased array 5 distributes according to power the optical radiation coupled from the strip-type waveguide 6, and this distribution taking place to various strip-type optical waveguides $5_1$ to $5_8$ and $5_0$ of the phased array 5, which waveguides have different optical lengths, in such a way that each of these waveguides $5_1$ to $5_8$ and $5_0$ respectively receives all the wavelengths $\lambda_1$ to $\lambda_8$ and $\lambda$.

The strip-type waveguides $5_1$ to $5_8$ and $5_0$ are on the other hand coupled to an output-side optical layer waveguide 3 of the phased array 5, in which the wavelengths $\lambda_1$ and $\lambda_8$ and $\lambda$, supplied to the strip-type waveguides $5_1$ and $5_8$ and $5_0$ and coupled into this layer waveguide 3, are superposed on one another in such a way that each one of these wavelengths $\lambda_1$ to $\lambda_8$ and $\lambda$ is concentrated respectively at a different place on an output-side frontal surface 30 of the layer waveguide 3. Each of these places corresponds to one individual wavelength channel, to which only the wavelength concentrated at this place is allocated, and there are thus individual wavelength channels separated spatially from one another, to each of which one of the wavelengths $\lambda_1$ to $\lambda_8$ and $\lambda$ is respectively allocated.

With the exception of the wavelength channel $\lambda$ allocated to the determined wavelength, in each of the wavelength channels allocated to the several wavelengths $\lambda_1, \lambda_2, \ldots \lambda_8$, respectively one strip-type optical waveguide 51, 52, . . . or, respectively, 58 is coupled to the frontal surface 30 of the layer waveguide 3, which conducts only the wavelengths allocated to this wavelength channel, $\lambda_1, \lambda_2, \ldots$ or, respectively, $\lambda_8$.

In the wavelength channel allocated to the determined wavelength $\lambda$, in contrast an inventive arrangement is coupled with the waveguide end segments 1 and 2 on the frontal surface 30 of the layer waveguide 3 (see in particular FIG. 4), e.g. in the form of the exemplary arrangement according to FIGS. 1 and 2.

In the example shown, the determined wavelength $\lambda$ is for example chosen so that it is the shortest wavelength.

Using this arrangement, the position of the wavelength channels on the frontal surface 30 of the layer waveguide 3 can be stabilized using the determined wavelength $\lambda$ as a reference wavelength, e.g. in the way specified in the above mentioned copending U.S. patent application, Ser. No. 08/788,189.

Although various minor modifications may be suggested by those versed in the art it should be understood that we wish to embody within the scope of the patent granted hereon all such modifications as reasonably and properly come within the scope of our contributions to the art.

We claim:

1. A method for operating an optical coupling arrangement having at least one pair of strip type optical waveguide end segments that extend alongside one another with ends arranged alongside one another for coupling optical radiation into a waveguide end segment wherein the ends are arranged at most at a small distance from one another so that crosstalk occurs in the optical waveguide end segments, and the end segments being arranged at a distance from one another that increases as the distance from the ends increases, said method comprising conducting radiation to be coupled into the end segments of the ends of the end segments in the form of a beam having a definite diameter which is adjusted to a definite position in relation to the ends of the waveguide end segments.

2. A method according to claim 1, wherein the beam is set to a determined position by means of displacement in a direction of the small distance between the ends of said waveguide end segments.

3. A method according to claim 1, wherein the definite diameter of the beam is essentially equal to the diameter of the fundamental mode conducted in the waveguide end segments.

4. A method according to claim 1, wherein the radiation to be coupled into the end segments is focused to a determined diameter at the end of the waveguide end segments which diameter is set to a determined position in relation to the ends.

5. In a method according to claim 1, wherein the position of the beam in relation to the ends depends on the wavelength of the radiation to be coupled into the end segments, and the beam is adjusted to the determined position by adjusting the wavelength of the radiation to a value corresponding to the determined position.

6. In a method according to claim 1, which includes setting a defined power ratio between a portion coupled into the one waveguide end segment and a portion coupled in the other waveguide segment of the radiation being supplied to the two waveguide end segments.

7. In a method according to claim 6, wherein the step of setting the defined power ratio comprises adjusting the determined position of the radiation relative to the ends of the end segments.

8. An optical coupling arrangement comprising a layer waveguide having a frontal surface and at least one pair of strip-type optical waveguide end segments, each end segment having an optical longitudinal axis, said frontal surface having at least two frontal surface segments that extend at an oblique angle to one another, an end surface of one of the pair of strip-type optical waveguide end segments being coupled to one of the frontal surface segments with the longitudinal axis of the one end segment extending substantially perpendicular to said one frontal surface segment and an end surface of the other waveguide end segment of the pair being coupled to the other frontal surface segment and having the longitudinal axis of the other end segment extending substantially perpendicular to the other frontal segment, said end segments extending alongside one another with the ends arranged alongside one another for coupling optical radiation into the waveguide end segments and the ends being arranged, at most, at a small distance from one another so that crosstalk will occur in the optical waveguide end segments, said oblique angle being selected with an angle $\alpha$ between the longitudinal axes of the end segments being smaller than an aperture angle of the ends of each of the waveguide end segments and with the distance d between the end segments increasing from the small distance as the distance from the frontal surfaces increases.

9. An arrangement according to claim 8, wherein the angle $\alpha$ is less than 2°.

10. An arrangement according to claim 8, wherein the ends of the light waveguide end segments are coupled to an individual light waveguide channel of an optical phase array which channel is allocated to a determined wavelength.

* * * * *